United States Patent [19]
Burns

[11] Patent Number: 5,828,769
[45] Date of Patent: Oct. 27, 1998

[54] METHOD AND APPARATUS FOR RECOGNITION OF OBJECTS VIA POSITION AND ORIENTATION CONSENSUS OF LOCAL IMAGE ENCODING

[75] Inventor: J. Brian Burns, Palo Alto, Calif.

[73] Assignee: Autodesk, Inc., San Rafael, Calif.

[21] Appl. No.: 735,621

[22] Filed: Oct. 23, 1996

[51] Int. Cl.$^6$ ................................ G06K 9/00; G06K 9/62
[52] U.S. Cl. .......................... 382/118; 382/215; 382/216; 340/825.3
[58] Field of Search ..................................... 382/215, 216, 382/219, 115, 116, 117, 118, 282, 291; 348/169; 340/825.3

[56] References Cited

U.S. PATENT DOCUMENTS

| | | | |
|---|---|---|---|
| 5,164,992 | 11/1992 | Turk et al. ................................ | 382/224 |
| 5,179,421 | 1/1993 | Parker et al. . | |
| 5,268,734 | 12/1993 | Parker et al. . | |
| 5,432,597 | 7/1995 | Parker et al. . | |
| 5,434,617 | 7/1995 | Bianchi . | |
| 5,465,144 | 11/1995 | Parker et al. . | |
| 5,471,296 | 11/1995 | Parker et al. . | |
| 5,471,541 | 11/1995 | Burtnyk et al. ......................... | 382/153 |
| 5,473,369 | 12/1995 | Abe . | |
| 5,517,300 | 5/1996 | Parker et al. . | |
| 5,521,634 | 5/1996 | McGary . | |
| 5,523,783 | 6/1996 | Cho . | |
| 5,561,518 | 10/1996 | Parker et al. . | |
| 5,561,519 | 10/1996 | Parker et al. . | |
| 5,570,177 | 10/1996 | Parker et al. . | |
| 5,572,317 | 11/1996 | Parker et al. . | |
| 5,610,653 | 3/1997 | Abecassis . | |
| 5,629,752 | 5/1997 | Kinjo ....................................... | 382/118 |
| 5,699,449 | 12/1997 | Javidi ....................................... | 382/118 |
| 5,715,325 | 2/1998 | Bang et al. ............................... | 382/118 |

OTHER PUBLICATIONS

R. Rao and D. Ballard, "Object Indexing using an Iconic Sparse Distributed Memory", *IEEE*, 1995, pp. 24–31.

X. Wu and B. Bhanu, "Gabor Wavelets for 3–D Object Recognition", *IEEE*, 1995, pp. 537–542.

T.K. Leung, M.C. Burl and P. Perona, "Finding Faces in Cluttered Scenes using Random Labeled Graph Matching", *IEEE*, 1995, pp. 637–644.

A. Khotanzad and Y. Hong, "Invariant Image Recognition by Zernike Moments", *IEEE Transactions on PAMI*, 12(5): 489–497, May, 1990.

(List continued on next page.)

*Primary Examiner*—Bipin Shalwala
*Attorney, Agent, or Firm*—Wilson Sonsini Goodrich & Rosati

[57] ABSTRACT

A method for recognition of an object in an image is provided, the method comprising the steps of: capturing in electronic memory multiple model images of the object; selecting from each captured model image multiple model image patches; encoding respective selected model image patches as respective sets of inner products of respective image patch data and a set of two-dimensional functions such that the respective sets of inner products include information useful in computing a pose estimate for the object; capturing in the electronic memory a current image; selecting from the captured current image multiple current image patches; encoding respective selected current image patches as respective sets of inner products of respective image patch data and the set of two-dimensional functions such that the respective sets of inner products include information useful in computing a pose estimate for the object; comparing respective current image patch encodings with respective model image patch encodings; identifying respective matches between current image patches and model image patches based upon said comparisons; computing respective object pose estimates that correspond to respective matches of current image patches and model image patches using respective inner products from such respective matching patches; identifying a respective object pose estimate that corresponds to the largest number of patch matches; and determining whether the object has been identified based upon the number of patch matches that correspond to the respective identified pose estimate.

24 Claims, 6 Drawing Sheets

OTHER PUBLICATIONS

W. Freeman and E. Adelson, "The Design and Use of Steerable Filters", *IEEE Transactions on PAMI*, 13(9): 891–906, Sep., 1991.

D. Ballard and L. Wixson, "Object Recognition Using Steerable Filters at Multiple Scales", *IEEE Workshop on Qualitative Vision*, 1993, pp. 2–10.

A. Califano and R. Mohan, "Systematic Design of Indexing Strategies for Object Recognition", *IEEE*, 1993, pp. 709–710.

R. Manmatha and J. Oliensis, "Extracting Affine Deformations from Image Patches—I: Finding Scale and Rotation", *IEEE*, 1993, pp. 754–755.

D.W. Thompson and J.L. Mundy, "Three–Dimensional Model Matching from an Unconstrained Viewpoint", *Proceedings of the IEEE International Conference on Robotics and Automation*, 1987, pp. 208–220.

Y. Lamdan and H.J. Wolfson, "Geometric Hashing: A General and Efficient Model–Based Recognition Scheme", *Proceedings of the International Conference on Computer Vision, IEEE*, 1988, pp. 238–249.

T. Reiss, Recognizing Planar Objects Using Invariant Image Features, Springer–Velag, 1993.

I. Rigoutsos and Hummel, "Distributed Bayesian Object Recognition", *IEEE*, 1993, pp. 180–186.

D. Ballard, Generalizing the Hough Transform to Detect Arbitrary Shapes, *Matching, Model Fitting, Deduction and Information Integration*, pp. 714–724.

T. Lindeberg and J. Garding, "Shape from Texture from a Multi–Scale Perspective", *Proc. 4th International Conference on Computer Vision*, May 1993, pp. 683–691.

METHOD AND APPARATUS FOR RECOGNITION OF OBJECTS VIA POSITION AND ORIENTATION CONSENSUS OF LOCAL IMAGE ENCODING

GOVERNMENT CONTRACT NOTICE

Research pertaining to this invention was sponsored by the Advanced Research Projects Agency's Real-Time Planning and Control Program under Contract DACA76-93-C-0017 and by the Air Force under AFOSR Contract F49620-95-C-0078.

BACKGROUND OF THE INVENTION

1. Field of the Invention

The invention relates generally to image recognition, and more particularly, to visual recognition of an object under arbitrary variations of three-dimensional position and orientation of the object and in spite of partial occlusion of the object.

2. Description of the Related Art

Recognition of an image of a real world object captured in digitized form in electronic memory typically involves a correlation of the captured digital image with stored reference information (an "object model"). The recognition of objects that can move about is complicated by the fact that such movement can change the instantaneous view of the object captured in digitized form. More specifically, the object movement can vary the three-dimensional position and orientation (the "pose") of the object relative to the camera. Moreover, object features may be partially occluded from time to time. Hence, the captured view of the object may not readily correspond to the stored reference information making it difficult to correlate the captured image with the stored reference information.

Consensus-based recognition and moment-based recognition are two different but well known approaches to image recognition. In consensus-base recognition, correspondences between numerous localized parts of an object model and localized parts of the captured image are formed. Each such local match votes for the object and object poses that are consistent with it. Recognition occurs if there is a large enough accumulation of votes for some object and pose. In moment-based recognition, an object image is filtered by a set of 2D functions that are related to the moments of the brightness distribution of the image. Recognition occurs if the filtered data for the captured image matches the filtered data for the reference object model.

Advantages of consensus-based recognition include simplicity and robustness with respect to large corruptions or loss of data such as by occlusion. Consensus-based techniques are related to: generalized Hough transforms described by, D. W. Thompson and J. L. Mundy, "Three-Dimensional Model Matching from an Unconstrained Viewpoint", *Proceedings of the IEEE International Conference on Robotics and Automation*, 1987, pp. 208–220; and to geometric hashing described by, Y. Lamdan and H. J. Wolfson, "Geometric Hashing: A General and Efficient Model-Based Recognition Scheme", *Proceedings of the International Conference on Computer Vision*, 1988, pp. 238–249. Hough transforms and geometric hashing each have been used to detect three dimensional (3D) objects.

There are, however, shortcomings to the earlier consensus-based recognition techniques. For example, these prior approaches often are limited by a dependence on special, potentially difficult-to-detect local image features, such as line junctions and elliptical arcs or image features that are too indistinct and ubiquitous, such as edge points. A system using edge points as a basis for identifying correlations between a captured image data and reference object data, for instance, may be burdened by too many local feature correspondences to process efficiently and by too much clutter in the space of possible poses or hash table in which vote cluster detection is performed. A. Califano and R. Mohan, "Systematic Design of Indexing Strategies for Object Recognition", *CVPR* 93, 1993, p.709, teach that methods of detection by voting become more efficient if local features are more uniquely characterized by higher dimensional descriptions. Thus, an important factor in the effective use of the consensus-based techniques for object recognition is the selection of appropriate features to be employed as a basis for comparison and matching. Unfortunately, relatively indistinct features, such as line junctions, elliptical arcs or edge points, for example, often have not served satisfactorily in that role.

Advantages of moment-based image recognition include the production of a relatively informative representation of an image that can be normalized with respect to changes in contrast and some distortions, for example, rotation in the image. Moreover, the moments can provide a relatively compressed image representation. If only a small series of moments are used to represent each local patch of an image, then the image processing can be made fast on standard processors.

More specifically, in moment-based approaches to image recognition, a digital representation of an image is filtered to produce a set of values, referred to as moments, that are representative of the image. These computed moments provide much information about the filtered image. Importantly, such computed moments generally contain significantly more information about an image than such indistinct image features as, for example, line junctions, elliptical arcs or edge points. There are numerous approaches to computing such moments. For instance, traditional moment methods may be employed such as those explained by, A. Khotanzad and Y. Hong, "Invariant Image Recognition by Zernike Moments", *IEEE Transactions on PAMI*, 12(5):489–497, May, 1990, and such as those explained by, T. Reiss, Recognizing Planar Objects Using Invariant Image Features, Springer-Velag, 1993. Moreover, methods of moment computation may involve steerable filters as, for example, taught by, D. Ballard and L. Wixson, "Objects Recognition Using Steerable Filters at Multiple Scales", *IEEE Workshop on Qualitative Vision*, p.2, 1993.; R. Rao and D. Ballard, "Object Indexing Using Iconic Sparse Distributed Memory", *ICCV*, p.24, 1995; and T. Leung, M. Burl and P. Perona, "Finding Faces in Cluttered Scenes using Labeled Graph Matching", *ICCV*, p.637, 1995. It will be appreciated that these techniques are related to Gabor wavelets described by, X. Wu and B. Bhanu, "Gabor Wavelets for 3D Object Recognition", *ICCV*, p.537, 1995.

The implementation of steerable filters as Gaussian derivatives at various scales is taught by W. Freeman and E. Adelson, "The Design and Use of Steerable Filters", *IEFE PAMI*, 13:9, p.891, September, 1991. These filters are actually linear combinations of brightness moments weighted by the Gaussians as taught by, R. Manmatha and J. Oliensis, "Extracting Affine Deformations from Image Patches I", *CVPR*, p. 754, 1993. For example, a series of derivatives of 2D Gaussians may be employed which are separated by a half-octave. Thus, steerable filters implemented as Gaussian derivatives convolved with the image are equivalent to Gaussian-weighted moments.

A shortcoming of moment-based recognition, however, is the instability of the moments with respect to occlusions, image clutter and other disruptions, for example. As a result, moments traditionally have been used to detect objects that are relatively isolated or in silhouette form. There have been attempts to overcome this problem. For instance, the use of a more robust feature matching process has been proposed by Rao and Ballard. Unfortunately, this technique may still be sensitive to occlusions or other changes in certain regions of an image patch. Moreover, it may be difficult to efficiently implement this matching process. Another attempt to overcome the problem, for example, involves the use of localized measurements from multiple image patches of different sizes distributed about an object image as suggested by Leung, T., et al. and by Rao and Ballard. However, each suggests the use of patches only in sparse sampling and without any method of correlating multiple match results under arbitrary variations of an object's 3D position and orientation. Although Wu and Bhanu consider the use of a larger number of locally encoded patches, they suggest an iterative match refinement technique which, although potentially useful for verifying and improving a pose estimate after an object has been roughly detected and located, is not particularly effective in recognizing an object in the first place.

Thus, there has been a need for an improved image recognition mechanism which employs a richer set of image information than such indistinct features as, for example, line junctions, elliptical arcs or edge points, and which is robust with respect to large corruptions of image data such as by occlusion, for example. The present invention meets this need.

SUMMARY OF THE INVENTION

In one aspect, the present invention provides a novel method for recognition of an object in an image. Multiple model images of the object are captured in digital form in an electronic memory. Multiple image patches are selected from each captured model image. The image data in the model image patches is encoded as sets of inner products of the model image patch data and a set of two-dimensional (2D) functions such that the sets of inner products include information useful in computing a pose estimate for the object. A current image of the object is captured in digital form in electronic memory, and multiple current image patches are selected from the captured current image. The image data in the current image patches is encoded as sets of inner products of the current image patch data and a set of 2D functions such that the sets of inner products include information useful in computing a pose estimate for the object. The current image patch encodings are compared with the model image patch encodings. Matches between current image patches and model image patches are identified based upon the comparisons. Respective object pose estimates are computed that correspond to respective matches of current image patches and model image patches; and the inner products from such matching patches are used in the object estimate pose computations. An object pose estimate is identified that corresponds to the largest number of patch matches. A determination is made as to whether the object has been identified based upon the number of patch matches that correspond to the identified pose estimate.

DETAILED DESCRIPTION OF THE PREFERRED EMBODIMENTS

The present invention comprises a novel method and apparatus for visual recognition of an object. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Hardware and Operating System Environment

Figure 1:
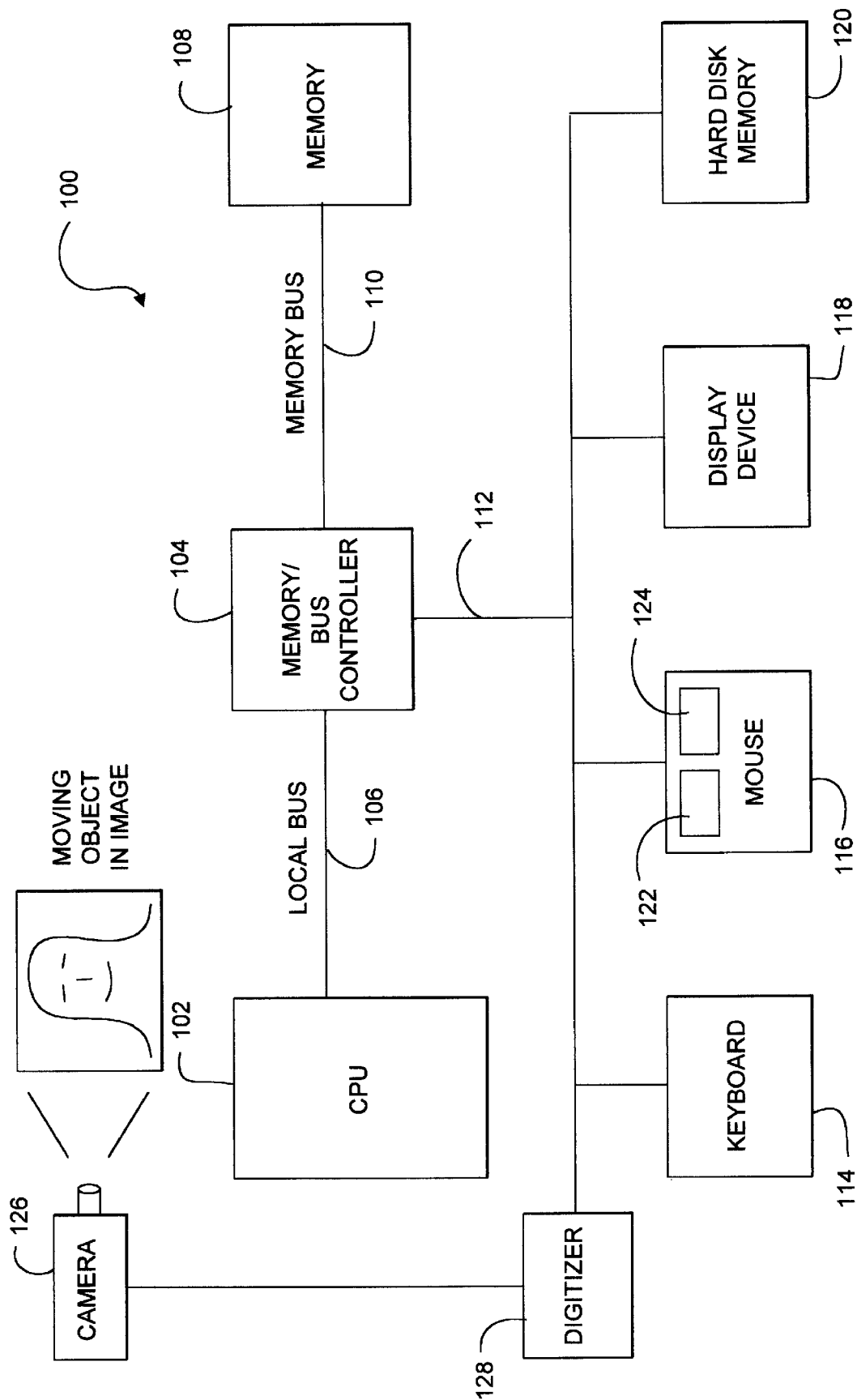
FIG. 1 is an illustrative block diagram of a computer environment including a camera in which the invention may operate.

Referring now to FIG. 1, there is shown a simplified block diagram illustrating an example of a general purpose programmable computer system 100 on which an embodiment of the invention may be used. In particular, system 100 includes a central processing unit (CPU) 102 for executing instructions and performing calculations, a memory/bus controller 104 coupled to the CPU 102 by a local bus 106, a memory 108 for storing data and instructions coupled to the memory/bus controller 104 by memory bus 110, a peripheral bus 112 coupled to the memory/bus controller 104, and Input/Output (I/O) devices 114–120 coupled to the peripheral bus 112. The various buses of this system 100 provide for communication among system components in a manner known in the art. The I/O devices 114–120 in system 100 include a keyboard 114, a mouse 116 or other control device, a CRT 118 or other display device and a hard disk memory 120 or other non-volatile storage device for storage of data and programs. In system 100, the mouse has mouse buttons 122 and 124. System 100 is running software that provides a graphical user interface.

Embodiments of the present invention may be used with commercially available computer systems such as IBM or Apple Macintosh compatible personal computers or with workstations from Silicon Graphics or Sun, for example. Moreover, a wide variety of operating systems might be used on such systems, including, for instance, the Apple Macintosh operating system, Microsoft Windows or UNIX. Embodiments of the present invention are not limited to use on any of these systems, however. In fact, embodiments of the invention are not limited to use with computer systems presently known in the art.

The complete system on which an embodiment of the invention may be used includes a mechanism for capturing video images, such as a video camera 126 connected to the computer through a video image digitizer 128. Alternatively, a digital video camera is connected directly to the computer.

Overview of Recognition in Accordance with the Invention

Figure 2:
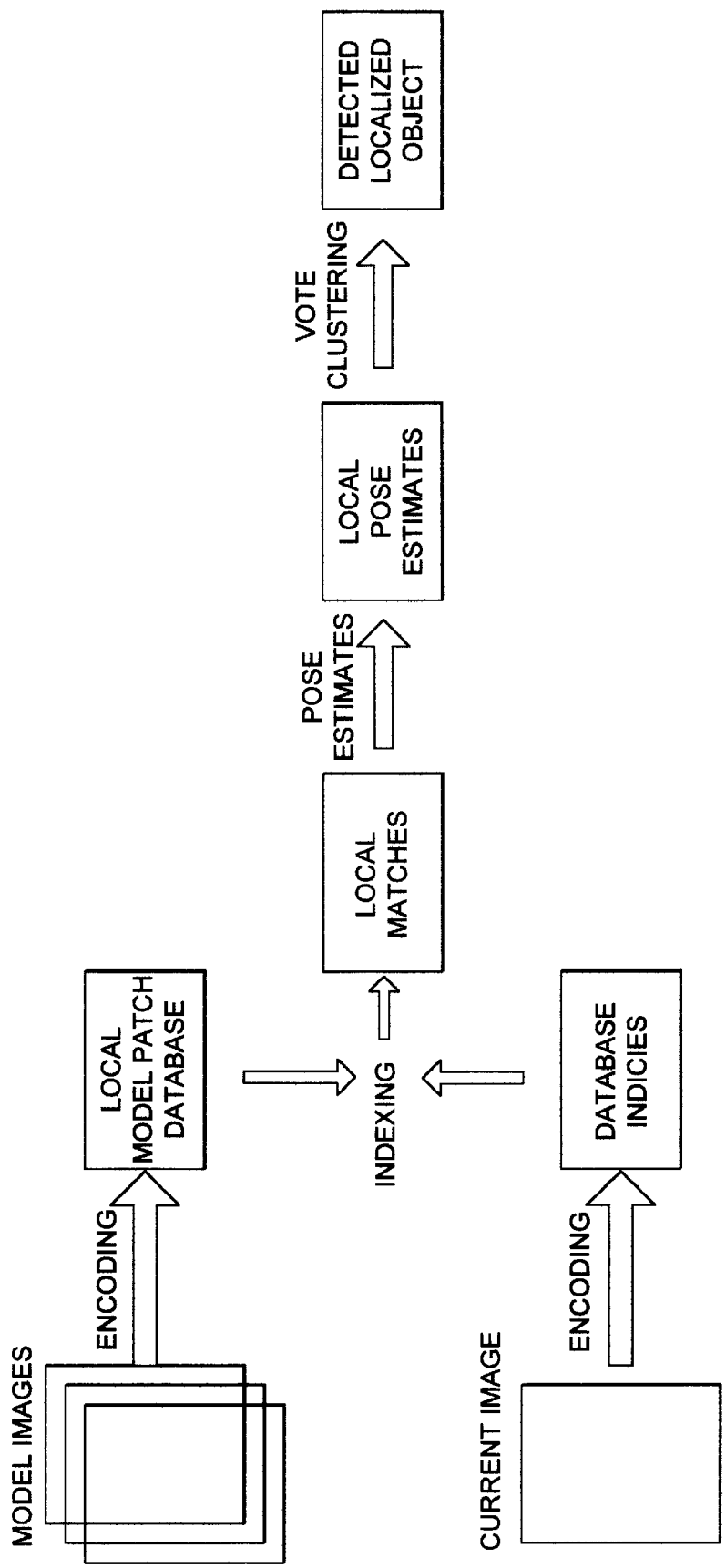
FIG. 2 is a process flow diagram which illustrates in general terms the processing of image information in accordance with a presently preferred embodiment of the invention.

The illustrative drawing of FIG. 2 exemplifies a computer program accomplishing image recognition in accordance with a presently preferred embodiment of the invention. It will be understood that the computer program resides in electronic memory and interacts with the CPU to effect results. Moreover, the computer program may be stored in temporary storage media such as a diskette or a CD from which it can be loaded into the computer environment.

Prior to an attempt to recognize a given object in an actual current image, a set of model images are captured in electronic memory from various three-dimensional (3D) views of that object. For each of these model images, the program selects local image patches at various image positions and scales. Each patch represents a different subset of an overall model image. For instance, if a model image is 100×100 pixels then a given patch might occupy a prescribed 10×10 region of the overall model image. In a current embodiment of the invention, each patch is encoded by the inner product of the patch with a set of derivatives of the 2D Gaussian at various scales. This reduces the patch information to a compact set of features, which are normalized with respect to certain image changes by representing the information in a transformation-invariant reference frame. Information for each patch is stored in a model data base residing in the computer memory and indexed by the characteristic features represented by the normalized encoding. In the present embodiment, this information includes the normalized features of the model patch and additional information about the model patch that can be used to compute a pose estimate when that model patch is matched to a current input patch.

During actual image recognition, a current image of an object to be evaluated is captured in electronic memory, and patches in the current image are selected and processed by the program in a manner similar to the processing of the patches from the model images as described above. More particularly, current image patches are encoded using the Gaussian derivatives, and the encoded information is normalized. Each encoded and normalized patch is used as an index into the model image data base to retrieve model patches that contain similar characteristic features. Thus, the processed patch information for each current patch is used to locate potentially matching processed patch information from the model images. It will be appreciated that each current patch may index multiple model image patches.

An object pose estimate is produced by the computer program for each pair of current image patch and potentially matching model image patch. An accumulator array is maintained in electronic memory which can store a vote tally for a multiplicity of possible object poses. For each pair comprising a current image patch and a potentially matching model image patch, a vote is produced for the approximate pose consistent with the potential match. Each vote results in the incrementing of an accumulator cell in the accumulator array associated with the approximate pose consistent with the potential match. After voting is complete, the accumulator cell with the largest vote count is selected, and provided that the count exceeds a prescribed threshold, a memory register indicating that the object has been recognized is set. The associated cell with the maximum vote can be interpreted as storing the object's approximate pose.

Image recognition in accordance with the presently preferred embodiment of the invention, therefore, advantageously combines moment-based image recognition and consensus-based image recognition. The image data corresponding to a large number of image patches of an object image are filtered so as to produce sets of processed image patch data that contain significant amounts of information about the image features represented in the different patches. In the present embodiment, multiple Gaussian derivatives are applied to a each collection of patch data in order to produce an encoding that is representative of the image features represented in the given patch data. This encoding generally provides significantly more detailed information about image features than, for example, mere line junctions, elliptical arcs or edge points, for example.

Moreover, image recognition in accordance with the present invention also helps narrow down the ambiguous local matches (patch-matches) from thousands of possibilities, and thus thousands of cluttering votes, to a few ambiguous local matches. It also provides data to locally estimate the object pose from a single patch-match pair, the global consensus of which can be used in the computer program to completely disambiguate the overall match. In particular, the encoding provides sufficient dimensional information about the features within an image patch to serve as the basis for computing pose estimates consistent with each potential match of a current image patch and a model image patch.

It will be understood that, typically there will be numerous potential matches between a given current patch and different model image patches. This is because different image features in different patches in the multiple model images may result in the production of similar encodings, and encoding a given current image patch may potentially match the similar encoding produced for different model image patches. More specifically, for example, although the actual features represented by different image patches may not be the same (e.g., a person's eye and a tuft of a person's hair), the encoding produced for the two patches nevertheless might be similar. Thus, individual encodings cannot be employed to unambiguously recognize an object feature. However, in accordance with the present embodiment of the invention, the dimensional information provided by the sets of moments can be used in the computer program to produce pose estimates corresponding to potential matches between current and model image patches. Consensus-based voting is applied to the pose estimates to disambiguate the potential matches and to ascertain whether the object under observation matches a possible pose of object of interest. If the vote results in a consensus that exceeds a prescribed threshold vote requirement, then it can be concluded that the object has been recognized.

Local Image Patch Encoding

Figure 3:
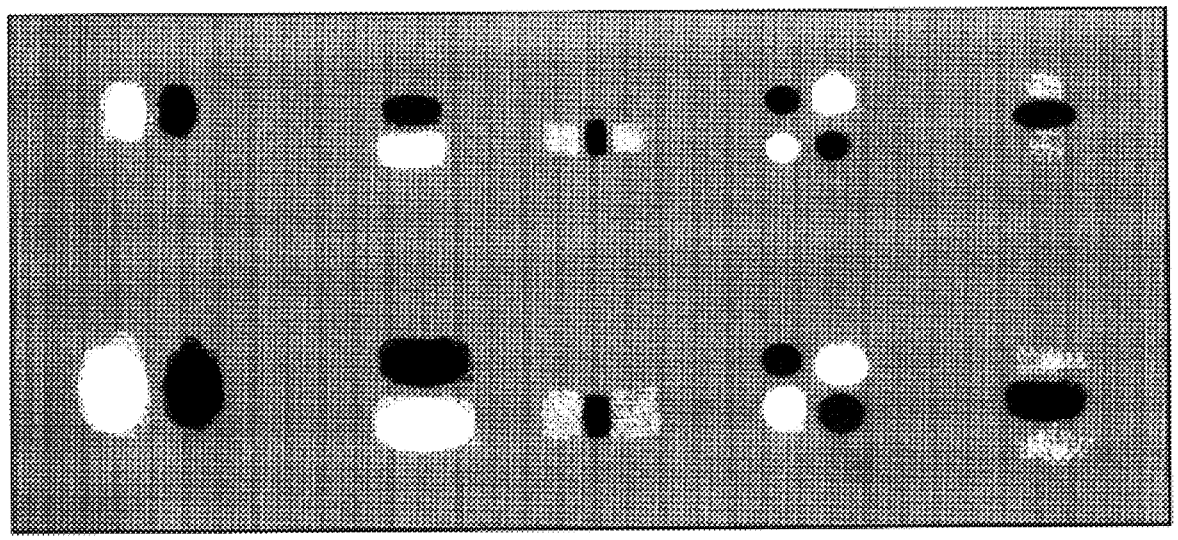
FIG. 3 is an illustrative drawing of derivatives of 2D Gaussian at two scales: bottom row is one half-octave larger than top and (left-to-right) gx, gy, gxx, gxy and gyy.

Each local image patch is encoded as a set of derivatives of Gaussians of different scale and order of derivative. In the present embodiment of the invention, two scales separated by an octave and all the first and second derivatives in the x and y directions were used; this creates ten measurements per patch. The illustrative drawings of FIG. 3 show the derivatives of 2D Gaussian employed in the current computer implementation.

The measurements are normalized with respect to changes in contrast and rotation in the image using the gradient of the larger scale: the responses are divided by the gradient magnitude and rotated so that the larger scale gradient is parallel to the x-axis. This gives eight remaining measurements to use as features. In the current implementation of the program, since all the odd derivatives (and all the even derivatives) are dependent, the feature space is transformed using principal component analysis over patch samples from the model images.

Experiments in running the computer program have shown that Gaussian derivatives have stability with respect to view changes, and are stable enough to be useful for discrimination purposes. For example, good matches have been demonstrated after 3D rotations of up to 22.5 degrees. Experiments also have shown stability with respect to scale changes. For instance, after changing the image scale by as much as twenty percent, the resulting feature vector's average distance from the unscaled patch's vector has been shown to be small relative to the distances between randomly paired patches. Thus, each local patch is represented by eight statistically independent features that show a strong ability to discriminate.

The process of encoding a local image patch, in accordance with a current computer software implementation of the invention, now will be described in detail. More specifically, the process involves the encoding for a local image patch centered at a given pixel location (x0,y0), where x and y are the spatial parameters of the image. The recognition algorithm encodes numerous current image patches and numerous model image patches in this fashion, each at a distinct location. The image patch is encoded as a vector of ten (10) numbers, each number being the inner product of the image with a different two-dimensional (2D) function "f."

The inner product of the image patch centered at (x0, y0) I(x,y) with a 2D function f(x,y) is:

$$\sum_{x=\min x}^{\max x} \sum_{y=\min y}^{\max y} I(x,y) * f(x,y) \quad (1)$$

The 10 different functions "f" used in the encoding are the first five spatial derivatives of the 2D Gaussian G(x0,y0,sigma,x,y) centered at (x0, y0), at two different scales (sigma1, sigma2). A 2D Gaussian centered at (x0,y0) and with scale sigma, G(x0,y0,sigma,x,y)=

$$\frac{\exp\left(\frac{(x-x0)^2 + (y-y0)^2}{-2\text{sigma}^2}\right)}{2\pi\text{sigma}^2} \quad (2)$$

Five derivatives were used at each of the two scales. For each scale, the derivatives are approximated by using finite differences and are the following:

$gx1(x,y)=G(x0,y0,sigma1,x,y)-G(x0-1,y0,sigma1,x,y)$ (3)

$gy1(x,y)=G(x0,y0,sigma1,x,y)-G(x0,y0-1,sigma1,x,y)$ (4)

$gxx1(x,y)=G(x0+1,y0,sigma1,x,y)-2*G(x0,y0,sigma1,x,y)+G(x0-1,y0,sigma1,x,y)$ (5)

$gxy(x,y)=G(x0,y0,sigma1,x,y)-G(x0-1,y0,sigma1,x,y)-G(x0,y0-1,sigma1,x,y)+G(x0-1,y0-1,sigma1,x,y)$ (6)

$gyy1(x,y)=G(x0,y0+1,sigma1,x,y)-2*G(x0,y0,sigma1,x,y)+G(x0,y0-1,sigma1,x,y)$ (7)

$gx2(x,y)=G(x0,y0,signa2,x,y)-G(x-1,y0,sigma2,x,y)$ (8)

$gy2(x,y)=G(x0,y0,sigma2,x,y)-G(x0,y0-1,sigma2,x,y)$ (9)

$gxx2(x,y)=G(x0+1,y0,sigma2,x,y)-2*G(x0,y0,signa2,x,y)+G(x0-1,y0,sigma2,x,y)$ (10)

$gxy2(x,y)=G(x0,y0,sigma2,x,y)-G(x0-1,y0,sigma2,x,y)-G(x0,y0-1,sigma2,x,y)+G(x0-1,y0-1,sigma2,x,y)$ (11)

$gyy2(x,y)=G(x0,y0+1,sigma2,x,y)-2*G(x0,y0,sigma2,x,y)+G(x0,y0-1,sigma2,x,y)$ (12)

It will be appreciated that, although the current computer software implementation employs derivatives of the 2D Gaussian to encode patch pixel data, other functions can be employed as well. It is generally sufficient that the encoding of an image patch is a set of inner products of the image patch with a respective set of two-dimensional (2D) functions such that the resulting inner products for a given image patch are: (1) sufficiently numerous and sufficiently statistically independent (or there are linear functions of the inner product set that have these properties) to make the identification of matching patches effective; (2) normalizable with respect to changes in the image that at least include change in contrast and rotation in the image plane; and (3) sufficient to estimate the object pose when the respective encoded patch is matched to other patches similarly encoded and when combined with the scale and position of the respective patches and the identity of the model image associated with the match. The functions employed here satisfy these requirements, but not necessary to the exclusion of other mathematical functions.

Patch Selection

A set of model images of an object is produced from a sampling of views. Due to the above-mentioned feature stability, each view angle parameter (pan and tilt) is sampled at roughly 45 degree intervals, where pan is a rotation about the object's vertical axis, and tilt is a rotation away from it. In one implementation, nine model image view samples were used, separated by roughly 45 degrees, covering somewhat less than a hemisphere of views (approximately a 135 degree spread.)

From each model image, patches of different scales and positions are selected by the computer program. Each patch has a scale associated with it, a base scale is the larger of the two Gaussian scales used to represent it. By using patches of different base scales, an object can be detected as it varies in size. Since the patch features have been shown to have good stability for at least up to 20% scale change (approximately a quarter octave), base scales with up to half an octave of separation have been used. In an experimental implementation, patches of three different base scales were used to cover about an octave range in scale.

With tens or hundreds of thousands of pixels in an image, the image patch positions must also be subsampled. This is because patches with centers that are only a pixel or so apart will be highly correlated (or redundant) and the resulting hundreds of thousands or millions of patches across all model images would be too large a number to effectively store and process. Regular grid sampling is not necessarily desirable since the sampling in the reference and input image are bound to not match under view change. For the experiments presented here, patches were selected based on the following criteria (although there are other means to do it):

I. The gradient of the larger scale must be above some threshold (contrast threshold). This allows the normalization to be stable.

II. The point must be a zero-crossing of the Laplacian of the Gaussian at the larger scale. This selects a scattering of patches at about the right density for certain types of objects of interest (human faces), and since the zero-crossings tend to be stable as the view changes, the patch positions tend to be roughly aligned.

III. A point must have patch features sufficiently different from its neighbors. (Neighbor distance threshold.)

One computer software implementation, following these policies in accordance with the invention created roughly 150–250 patches for a 256 by 240 image and a base scale (Gaussian) of 5 to 7 pixels. With three scales and nine views, roughly 4,000 to 7,000 patches are created to model the object's appearance. It is important to note that the zero-crossing restriction reduces the number of patch features to seven, since the two second derivatives at the larger scale are now dependent. However, they are effectively used to discriminate the selected patches from the great majority that are not selected.

Indexing

Indexing is employed in the computer program to make matching at the local patch level more efficient. In the current embodiment of the invention, features of a patch are quantized, and the quantized value is used as an index. To allow for some additional feature variation, the quantization ranges can be overlapped by some amount (quantization overlap). This means that there may be multiple entries in an index table per model patch stored, but during recognition, the input image patch indexes only a single cell and is thus very efficient.

In one experimental implementation, a quantization level of three buckets was used. This resulted in a table of $3^7=2187$ distinct cells. The overlap policy produced about ten (10) storages per patch, or roughly 40,000 to 60,000 total. The retrieval rate (the number of model patches retrieved per input image patch during matching) ranged from 30 to 70. Considering that about 4,000 to 7,000 patches were used to represent the 3D object in a wide range of poses, this implies that at most about one percent of the model patches are selected during indexing.

More specifically, in the presently preferred embodiment of the invention, the index is calculated by the computer program in three steps:

I. the features are normalized with respect to changes in image contrast and image rotation (rotation about the optical axis).

II. the features are quantized.

III. a single number, the index i, is computed from the quantized features.

The procedure for calculating the index is the same for current image patches and model image patches.

I. The features are normalized with respect to changes in image contrast and image rotation.

$$m = \sqrt{(gx2)^2 + (gy2)^2} \tag{13}$$

$$c = gx2/m \tag{14}$$

$$s = gy2/m \tag{15}$$

Note that the gradient magnitude, m, computed in equation (13) is a function of the encoded feature values computed in equations (8) and (9).

The normalized encoding values are as follows:

$$gx2' = (gx1*c + gy1*s)/m \tag{16}$$

$$gy1' = (-gx1*s + gy1*c)/m \tag{17}$$

$$gxx1' = (gxx1*c*c + gxy1*2*s*c + gyy1*s*s)/m \tag{18}$$

$$gxy1' = (-gxx1*s*c + gxy1(c*c - s*s) + gyy1*s*c)/m \tag{19}$$

$$gyy1' = (gxx1*s*s - gxy1*2*s*c + gyy1*c*c)/m \tag{20}$$

$$gxx2' = (gxx2*c*c + gxy2*2*s*c + gyy2*s*s)/m \tag{21}$$

$$gxy2' = (-gxx2*s*c + gxy2(c*c - s*s) + gyy2*s*c)/m \tag{22}$$

$$gyy2' = (gxx2*s*s - gxy2*2*s*c + gyy2*c*c)/m \tag{23}$$

Note that after normalization, gx2' and gy2' are always 1 and 0, respectively, and thus are not used as normalized features in the next step.

Also, note that, as explained below, the gx2 and gy2 values used to normalize the image with respect to rotation are the same values used to compute relative roll between a current image patch and a model image patch. Thus, a current image patch and a model image patch will have the same index regardless of roll, if they otherwise match.

II. The eight normalized features are quantized by the computer program. After quantization, each quantized feature qj (j=0 to 7) has one of n possible values, where n is a system parameter that can be set to any value, and qj is the quantized value of the jth component of the feature vector. Setting n to 3 works well, although other values can be employed as alternatives. During quantization, each pre-quantized feature value vj (j=0 to 7) is quantized in the following way:

$$qj = floor[(vj + maxmagj)*n/(2maxmagj)] \tag{24}$$

$$\text{if } qj > n-1 \text{ then } qj = n1 \tag{25}$$

$$\text{if } qj < 0 \text{ then } qj = 0 \tag{26}$$

where maxmagj is a system parameter that represents the rough maximum magnitude of the pre-quantized feature value vj. Note that the above shows quantization without overlap. Quantization with overlap can be used instead consistent with the invention.

III. A single number, the index i, is computed from the quantized features qj (j=0 to 7) using the following formula:

$$i = \sum_{j=0}^{7} n^j q_j \tag{27}$$

Voting and Detection

When the indices of a model image patch and a current object image patch match, information about their positions, scales and orientations of their gradients, as well as information about the 3D view associated with the model image patch, can be used by the computer program to roughly estimate the object pose transformation consistent with the match.

Stored in electronic memory with the model patch encoding is its scale and its 3D view in pan and tilt parameters. These values are produced at the time the model object image is captured. They facilitate a rough estimate of the pose parameters. A 2D rotation between the patches can be estimated by the difference in the gradient orientation of the two matched patches. This leaves the parameters representing the object translation in the image plane to be determined.

Image translation is estimated in two steps. During model image capture, a point on the surface of the object is tracked from frame to frame and is used as an arbitrary origin (or center) for the object. For each model patch, the image position of the origin (or center) relative to the model patch is stored with the patch in computer memory. This relative position is in a reference frame defined by the position of the model patch in the image, its base scale and the orientation of the gradient at the base scale.

During the recognition phase of the program, the object origin will have approximately the same relative position with respect to the correctly matched current image patch as with the model patch, and the origin's absolute image position can be recovered given the position, gradient orientation and scale of the matching input patch. This object position calculation during recognition is relatively simple, making the overall pose voting step quite efficient.

More specifically, there are six pose parameters that represent the 3D orientation and position of the sought-for object relative to the camera: Three (3) rotation (pan, tilt, roll) and three (3) (x, y, scale) position parameters. The "pan" and "tilt" parameters span the complete set of angles from which the camera can view the object. (For example, viewing from the left side, top, front, etc.). "Roll" represents the rotation of the object about the camera optical axis: the rotation in the image plane. (For example, the object may be facing the camera and either be upright relative to the camera, or leaning to one side. Upright verses leaning can be represented by the roll parameter.)

The position of the object relative to the camera is represented in an image-relative fashion. This is sufficient for distinguishing unique positions for the purpose of finding pose-consistent sets of local patch matches. The three parameters are: the "x" position in the image of the object center's projection, it's "y" position, and the "scale" of the projection of the object in the image. The latter is monotonically related to the distance of the object from the camera, and is thus used to represent it. The object center (xc,yc) is arbitrary: any point on the object can be used. The scale of an image patch is equivalent to the sigmas (sigma1 and sigma2) of the Gaussian inner products used in the encoding. Thus, two model images of the same view angle and different scales are in practice the same image processed with different Gaussian scales (sigmas). The "scale" of an image will refer to the value of sigma2 used in the feature measurement step.

In a current implementation of the invention as a computer program, the process of determining the object pose given the match of an image and a model patch includes three steps:

I. determine pan, tilt and scale from the model image matched.
II. determine roll from the difference in orientation of local gradient.
III. determine x and y from the model patches offset with respect to the object center.
I. Pan, tilt and scale: Prior to recognition, views of the object of different pan, tilt and scale are stored. During the local matching process, when a given model image patch is retrieved from the data base and is matched to a given current image patch, it is associated with a specific model image of a specific pan, tilt and scale. Thus, the pan, tilt and scale parameters are determined by noting the model image associated with the match and by recording and storing these parameters for each model image during the modeling phase of the whole process.

II. Roll: Stored and retrieved with each model image patch is an orientation parameter "thetam", ($\theta_m$), and computed from each current image patch is an orientation parameter "thetai", $\theta_i$. Roll is computed in the following way:

$$thetam = arctan(gy2m/gx2m), \text{ where } gy2m \text{ and } gx2m \text{ are the } gy2 \text{ and } gx2 \text{ features of the model image patch} \quad (28)$$

$$thetai = arctan(gy2i/gx2i), \text{ where } gy2i \text{ and } gx2i \text{ are the } gy2 \text{ and } gx2 \text{ features of the current image patch.} \quad (29)$$

$$roll = thetai - thetam \quad (30)$$

Note that (gx2, gy2) is the gradient of the image at scale sigma2.

III. The position parameters x and y: Stored in the computer memory and retrieved with each model patch is the position of the object center in the model image patch reference frame (xcm, ycm), and the position of the object center in the current image (x,y) is estimated as follows:

$$magm = sqrt(gx2m*gx2m + gy2m*gy2m), \quad (31)$$

where gy2m and gx2m are the gy2 and gx2 features of the model image patch $$cm = gx2m/magm \quad (32)$$

$$sm = gy2m/magm \quad (33)$$

$$xcm = [cm*(xc-xm) + sm*(yc-ym)]/sigma2m \quad (34)$$

$$ycm = [-sm*(xc-xm) + cm*(yc-ym)]/sigma2m \quad (35)$$

where (xc, yc) is the object center in the model image, (xm, ym) is the position of the given model image patch in the model image, sigma2m is the sigma2 used to process the given model image patch.

$$magi = sqrt(gx2i*gx2i + gy2i*gy2i), \quad (36)$$

where gy2i and gx2i are the gy2 and gx2 features of the current image patch $$ci = gx2i*magi*sigma2i \quad (37)$$

$$si = gy2i*magi*sigma2i \quad (38)$$

where sigma2i is the sigma2 used to process the current image patch $$x = ci*xcm - si*ycm + xi \quad (39)$$

$$y = si*xcm + ci*ycm + yi \quad (40)$$

where (xi, yi) is the position of the current image patch in the current image

Vote Clustering

Given a set of matches between model image patches and current image patches, an estimate of the object pose (pan, tilt, roll, scale, x, y) can be produced by computer program from each match. Vote clustering is a method of finding the estimated pose that is approximately consistent with the greatest number of patch matches. The vote clustering procedure in accordance with a current computer implementation of the invention is as follows:

I. Initialize an array V of memory locations (cells) to zero. There is a dimension in array V for every pose parameter. The number of cells in each dimension j is nj, for j=0 to 5. The address of each memory location is a vector (i0, i1, i2, i3, i4, i5), where each component ij can range from 0 to nj.

II. For every patch match, compute the address vector from the estimated pose parameters and add one (1) (vote) to the memory location at this address. Each address component is computed by:

$$ij=floor((pj-minpj)*nj/(maxpj-minpj)), \qquad (41)$$

where pj is the estimated value of the jth pose parameter, and minpj and maxpj is the range for that pose parameter.

III. Scan the array for the memory location with the largest number (i.e., the largest number of votes) and approximate the object pose by computing each pose parameter pj from each address component ij:

$$pj=ij*(maxpj-minpj)/nj+minpj \qquad (42)$$

Thus, once the current object image has been recognized, the current object pose parameters can be ascertained through the above equation. This information can be useful in object tracking, for example.

EXAMPLE

In summary, in a current implementation of the invention, pose estimates and consensus voting techniques are employed to disambiguate the apparent matches of current and model image patches in order to determine whether or not an object corresponding to the model images really can be recognized in the current image. As explained above, indices produced from the current image patch encodings are compared with indices produced from model image patch encodings to determine which current image patches possibly correspond to model image patches. Next, pose estimates are computed from the encoded data of the tentatively matched patch pairs. Finally, through a consensus voting technique, these computed pose estimates are used to disambiguate the apparent matches so as to ascertain which apparent matches are the result of actual correspondences of current and model image patches. This process is further illustrated in the following simplified example.

In the current implementation and in this example, the raw image data comprises pixel brightness data, also referred to as grey scale data and image intensity data. However, the principles of the invention also can be applied to other forms of pixel data as well. For example, the raw image data could be pixel texture data or pixel color data.

Figure 4A:
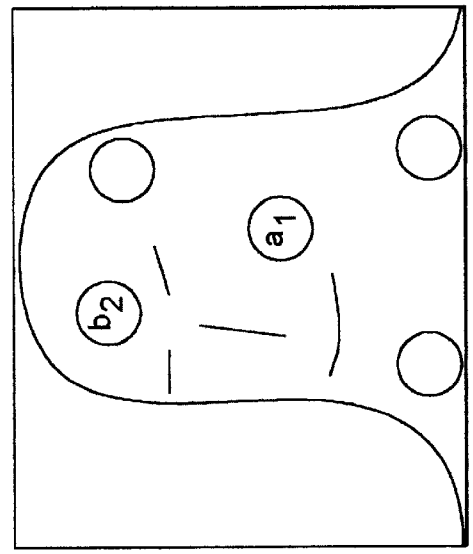
FIGS. 4A–4C are generalized illustrative drawings of (partial front right (4A), front (4B) and partial front left (4C)) model object image views of a person's face captured in digital form in electronic memory of the computer environment by the camera of FIG. 1.
Figure 4B:
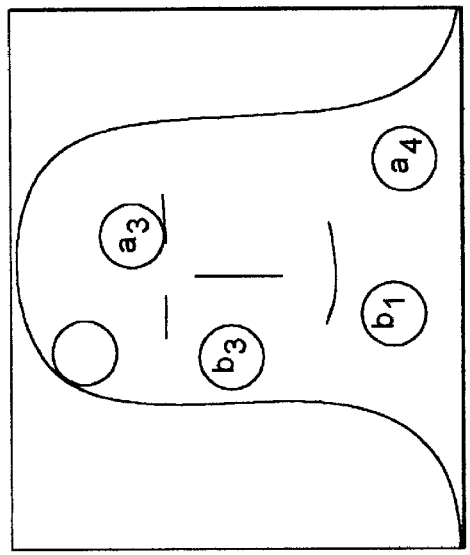
Figure 4C:
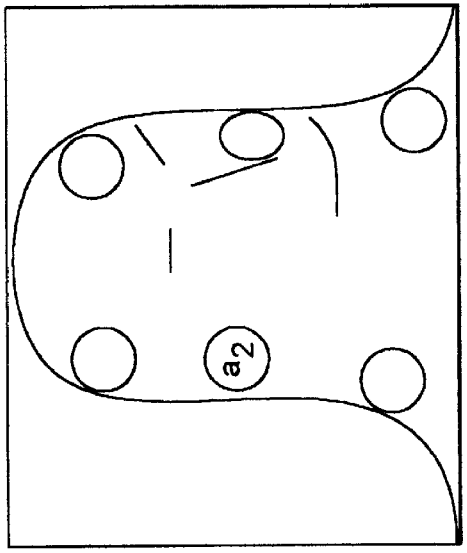

Referring to the illustrative drawings of FIGS. 4A–4C, there are shown three exemplary model images captured in electronic memory to serve as reference object images during an image recognition process in accordance with the invention. It will be appreciated that in general more model images typically are captured in connection with a current implementation of the invention. However, only three captured model images are used here in order to simplify the example. FIGS. 4A–4C show model images of the same face, which includes eyes, nose and mouth features, in three different poses. The sets of pose parameters set forth below are stored in electronic memory in association with their corresponding model image data. These pose parameters are ascertained in the course of the process of capturing the respective model images.

|  | FIG. 4A | FIG. 4B | FIG. 4C |
|---|---|---|---|
| pan: | +45 degrees | 0 degrees | −45 degrees |
| tilt: | 0 degrees | 0 degrees | 0 degrees |
| scale: | 2 | 2 | 2 |

The various circular regions within the model images represent a few of the many different patch positions and sizes that may be selected within the model images. In a typical implementation of the present invention numerous patches are selected and processed per model image. However, only a few exemplary patches are used here in order to simplify the example.

Figure 5:
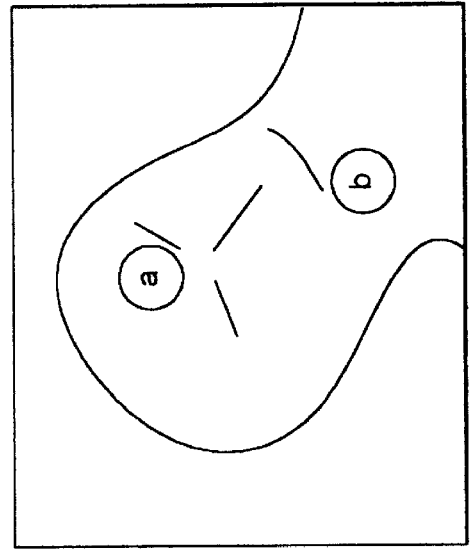
FIG. 5 is an illustrative drawing of a generalized view of a current object image captured in digital form in electronic memory of the computer environment by the camera of FIG. 1.

Referring to the illustrative drawing of FIG. 5, there is shown an exemplary current image captured in electronic memory. This current image is evaluated against the captured model images in accordance with the principles of the invention in order to determine whether the current image can be recognized as corresponding to one or more of the model images. The current image has an unknown pose prior to the recognition process described herein. The two circular regions within the current image represent a few of the different patch positions and sizes that may be selected within the current image. An objective of the recognition process in accordance with a present embodiment of the invention is to determine whether the current image has a pose that can be identified through comparisons between the pose estimates of various patches of the current and model images.

More specifically, the respective model image data captured for each of the model image patches are processed: encoded (1)–(12), normalized (13)–(23), quantized (24)–(26) and indexed (27). Thus, the image data of model image patches A1, A2, A3, A4, B1, B2 and B3 are processed such that the image data in each such patch is represented by a single index value. As explained above, however, index values of different patches may overlap. The respective model image data captured for each of the current image patches are similarly processed: encoded, normalized, quantized and indexed. The image data of current image patches "A" and "B" are similarly processed such that each is represented by a respective index value. The indices of the current image patches are compared with the indices of the model image patches to identify patch-match pairs.

In this example, current image patch "A" will be assumed to correctly match model image patch "A3". Current image patch "B" will be assumed to correctly match model image patch "B1". However, current image patch "A" will be assumed to also incorrectly match model image patches "A1", "A2" and "A4". Moreover, current image patch "B" will also be assumed to incorrectly match model image patches "B2" and "B3". As explained elsewhere herein, matching of patches occurs when the indices computed from the moments of two different patches are substantially the same. In the case of current image patch "A" and model image patch "A3", the matching of indices occurred because the patches correspond to the same features in the two images. However, in the case of current image patch "B" and model image patches "B2" and "B3", for example, the incorrect match occurred because different features produced the same or different sets of moments that nevertheless each computed to the same index. Hence, there is ambiguity as to which matching current and model image patch- match really correspond to each other despite their matching indices.

Figure 6B:
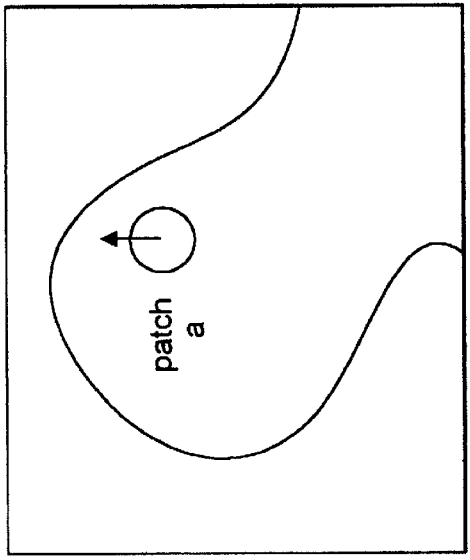
FIG. 6B is another illustrative drawing of the generalized view of FIG. 5 showing a selected patch and a vector.
Figure 6A:
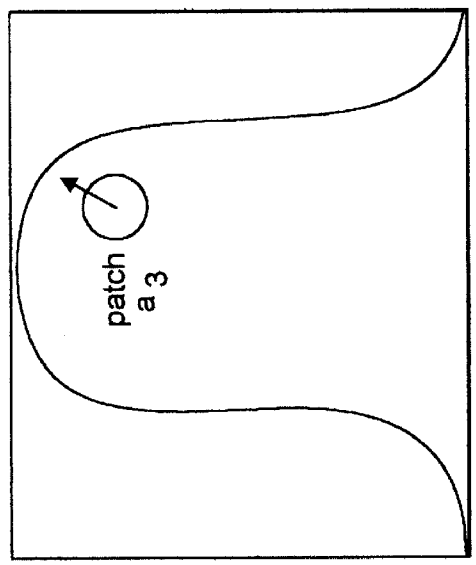
FIG. 6A is another illustrative drawing of the generalized view of FIG. 4B showing a selected patch and a vector.

This example sets forth details of an illustrative pose estimate computed in connection with the disambiguation of the A-to-A3 patch-match pair. The pan, tilt and scale parameters stored in association with model image patch A3 are retrieved. Rereferring to the illustrative drawings of FIGS. 6A and 6B, the values of thetam ($\theta_m$) and thetai ($\theta_i$) are calculated for model image patch A3 and for current image patch "A". Thetam ($\theta_m$) and thetai ($\theta_i$) are computed from processed patch data values stored as part of the processed patch data. In this example, $$thetam = arctan(gy2m/gx2m) = 70 \text{ degrees in accord with (28); and}$$

$$thetai = arctan(gy2i/gx2i) = 105 \text{ degrees in accord with (29).}$$

Therefore, in this example, $$roll = (105-70) = 35 \text{ degrees in accord with (30).}$$

Figure 7:
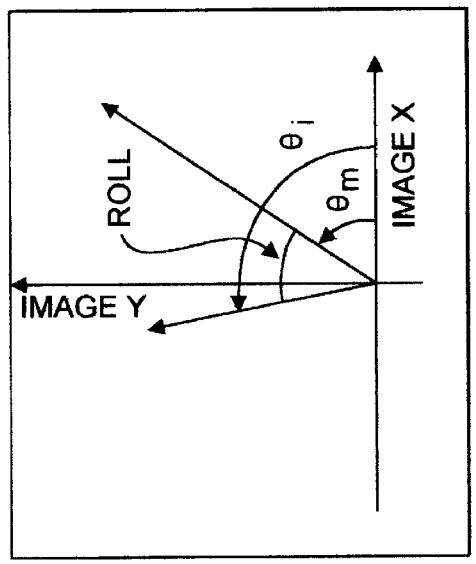
FIG. 7 is an illustrative drawing showing the relationship of the thetam ($\theta_m$) the thetai ($\theta_i$) and roll.

The illustrative drawing of FIG. 7 shows the relationship of angles thetam and thetai and the roll parameter.

Figure 8B:
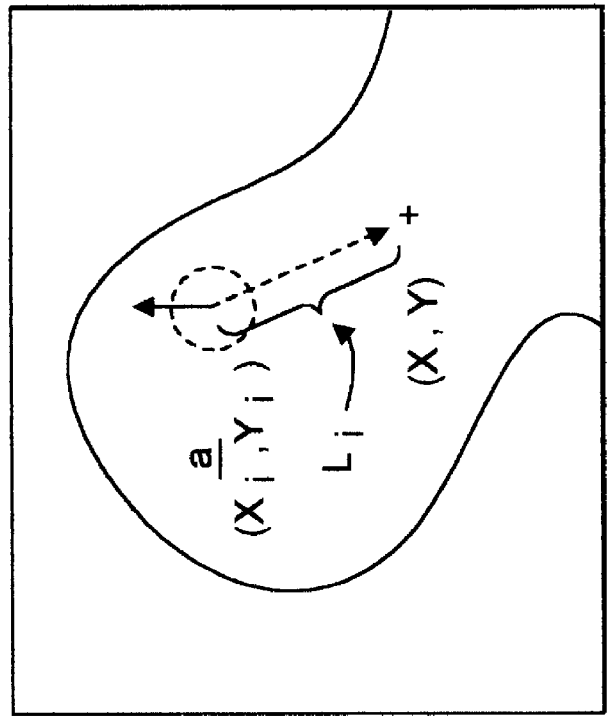
FIG. 8B is another illustrative drawing of the generalized view of FIGS. 5 and 6B showing the selected patch, a vector and centering parameters.
Figure 8A:
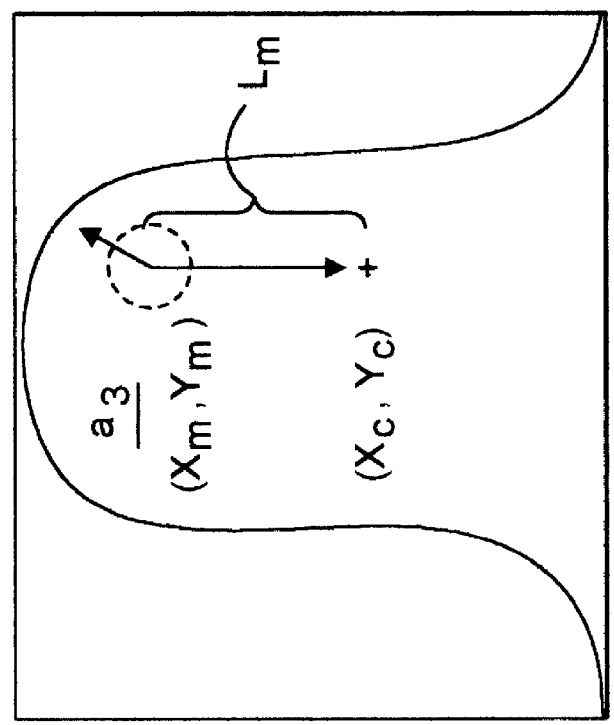
FIG. 8A is another illustrative drawing of the generalized view of FIGS. 4B and 6A showing the selected patch, a vector and centering parameters.

Referring to the illustrative drawings of FIGS. 8A and 8B, the center of the current image patch is (xi,yi). The object center in the current image (x,y), which is an unknown to be computed. The center of the model image patch A3 is (xm,ym). The object center in the model image in FIG. 4B is (xc, yc) determined during the model image acquisition phase by tracking the object center in the model images. The distance and direction between (xm,ym) and (xc,yc) is represented by a vector Lm, computed as, $$Lm = [(xcm, ycm) - (xm, ym)] \quad (43)$$

The value Lm is rotated by -thetam and is scaled by 1/sigma2m to represent it in the local reference frame of the model patch. In order to produce Li which is a vector indicating the distance and direction of the object center in the current image (x,y) from the center of the current image patch "A", (xi,yi), the modified value Lm is further rotated by thetai and scaled by sigma2i. Finally, the object center in the current image is computed by adding the image patch center to Li[(x,y)=Li+(xi,yi)]. Thus, the x and y parameters representing the center of the current image in FIG. 5 can be computed. In this example, we shall assume that (x,y)=(350, 150).

The pose estimate for the A-to-A3 patch-match pair include the following parameters, pan=0°
tilt=0°
scale=2
roll=35°
x=350
y=150

Moreover, in this example, the system parameters which are fixed for all patch-match pairs and which are used in the parameter quantization are as follows,

| minpan = 90° | maxpan = +90° | numpan = 3 |
| mintilt = 90° | maxtilt = +90° | numtilt = 3 |
| minscale = 1 | maxscale = 4 | numscale = 4 |
| minroll = -90° | maxroll = +90° | numroll = 3 |
| minx = 0 | maxx = image width | numx = 4 |
| miny = 0 | maxy = image height | numy = 4 |

Finally, the parameter quantization (42) using the above pose estimates parameters and the above system parameters are as follows, $$pan\ index = 1 = floor[(0-(-90°))*3/(90-(-90))]$$

$$tilt\ index = 1 = floor[0-(-90°)*3/90-(-90)]$$

$$scale\ index = 1 = floor[(2-1)*3/(4-1)]$$

$$roll\ index = 1 floor[35-(-90)*3/(90-(-90))]$$

$$x\ index = 2 = floor[(350-0)*4/(500-0)]$$

$$y\ index = 1 = floor[(150-0)*4/(500-0)]$$

Therefore, the vote array index for the A-to-A3 patch-match pair is (1,1,1,1,2,1).

Accordingly, a vote count stored in an array cell in electronic memory which corresponds to parameter combination (1,1,1,1,2,1) is incremented by one. It will be appreciated that although only a single cell is incremented in this example, there are a multiplicity of cells in the array. Each corresponds to a different combination of pose estimate parameters. Each cell is incremented when a patch-match results in the pose estimate that corresponds to the cell. During cluster vote selection, the array cell with the largest count is selected as the cell most likely to contain an accurate pose estimate for the current image. If this count exceeds a prescribed threshold, which can be calculated empirically, then the current object image is determined to have been recognized as corresponding to the stored reference model object images. If the count does not exceed the threshold, then the opposite is true.

While a particular embodiment of the invention has been described in detail, various modifications to the preferred embodiment can be made without departing from the spirit and scope of the invention. Thus, the invention is limited only by the appended claims.

What is claimed is:

1. A method for recognition of an object in an image comprising the steps of:

capturing in electronic memory multiple model images of the object;

selecting from each captured model image multiple model image patches;

encoding respective selected model image patches as respective sets of inner products of respective image patch data and a set of two-dimensional (2D) functions such that the respective sets of inner products include information useful in computing a pose estimate for the object;

capturing in the electronic memory a current image;

selecting from the captured current image multiple current image patches;

encoding respective selected current image patches as respective sets of inner products of respective image patch data and the set of two-dimensional (2D) functions such that the respective sets of inner products include information useful in computing a pose estimate for the object;

comparing respective current image patch encodings with respective model image patch encodings;

identifying respective matches between current image patches and model image patches based upon said comparisons;

computing respective object pose estimates that correspond to respective matches of current image patches and model image patches using respective inner products from such respective matching patches;

identifying a respective object pose estimate that corresponds to the largest number of patch matches.

2. The method of claim 1 wherein,
the set of 2D functions in said step of encoding respective selected model image patches includes a set of 2D Gaussian functions; and
the set of 2D functions is said step of encoding respective selected current image patches includes a set of 2D Gaussian functions.

3. The method of claim 1 wherein,
the set of 2D functions in said step of encoding respective selected model image patches includes a set of spatial derivatives of a 2D Gaussian function; and
the set of 2D functions is said step of encoding respective selected current image patches includes a set of spatial derivatives of a 2D Gaussian function.

4. The method of claim 1 wherein,
the set of 2D functions in said step of encoding respective selected model image patches includes a set of spatial derivatives of a 2D Gaussian function at least two different scales; and
the set of 2D functions is said step of encoding respective selected current image patches includes a set of spatial derivatives of a 2D Gaussian function at least two different scales.

5. The method of claim 1 wherein said step of capturing in electronic memory multiple model images of the object includes capturing different images of the object from different view angles.

6. The method of claim 1 wherein said step of selecting model image patches involves selecting model image patches that are sufficiently distant from selected neighbor model image patches so that such selected model image patches and such selected neighbor model image patches encompass distinct image features.

7. The method of claim 1 wherein,
said step of selecting model image patches involves selecting model image patches that are sufficiently distant from selected neighbor model image patches so that such selected model image patches and such selected neighbor model image patches encompass distinct image features; and
said step of selecting current image patches involves selecting current image patches that are sufficiently distant from selected neighbor current image patches so that such selected current image patches and such selected neighbor current image patches encompass distinct image features.

8. The method of claim 1 wherein said step of selecting model image patches involves selecting model image patches which include encodings that are stable as image view changes.

9. The method of claim 1 wherein,
said step of selecting model image patches involves selecting model image patches that are stable as object image view changes; and
said step of selecting current image patches involves selecting current image patches that are stable as object image view changes.

10. The method of claim 1 wherein,
said step of selecting model image patches involves selecting model image patches such that the sets of inner products produced from the model image patch data are normalizable; and
said step of selecting current image patches involves selecting current image patches that the sets of inner products produced from the current image patch data are normalizable.

11. The method of claim 1 including the further steps of:
normalizing the respective model image patch encodings and respective current image patch encodings with respect to changes in at least one of image contrast or image orientation;
wherein said step of comparing involves comparisons of respective normalized model image patch encoding information and respective normalized current image patch encoding information; and
wherein said step of identifying involves identifying matches between respective normalized model image patch encoding information and respective normalized current image patch encoding information.

12. The method of claim 1 including the further steps of:
producing respective indexes corresponding to respective encodings of model image patches and associating together in the electronic memory respective encoding information relating to respective model image patches that have overlapping indexes; and
producing respective indexes corresponding to respective encodings of current image indexes;
wherein said step of comparing involves comparisons of respective model image indexes and respective current image patches; and
wherein said step of identifying involves identifying matches between respective model image indexes and respective current image indexes.

13. The method of claim 1 including the further steps of:
normalizing the respective model image patch encodings and respective current image patch encodings with respect to changes in at least one of image contrast or image orientation;
quantizing the respective normalized model image patch encodings and the respective current image patch encodings;
producing respective indexes corresponding to respective normalized quantized model image encodings and associating together in the electronic memory resulting quantized encoding information relating to respective model image patches that have overlapping indexes; and
producing respective indexes corresponding to respective normalized quantized current image encodings;
wherein said step of comparing involves comparisons of respective model image indexes and respective current image patches; and
wherein said step of identifying involves identifying matches between respective model image indexes and respective current image indexes.

14. The method of claim 1 including the further steps of:
producing respective indexes corresponding to respective encodings of model image patches and associating together in the electronic memory respective model image encoding information relating to respective model image patches that have overlapping indexes; and
producing respective indexes corresponding to respective encodings of current image indexes;
wherein said step of comparing involves comparisons of respective model image indexes and respective current image patches;
wherein said step of identifying involves identifying matches between respective model image indexes and respective current image indexes; and wherein said step of computing involves determining a respective current image pose estimate for each respective model image patch encoding associated in the electronic memory with respective indexes identified in said step of identifying respective matches.

15. The method of claim 1 including the further steps of:

producing respective indexes corresponding to respective encodings of model image patches and associating together in the electronic memory respective model image encoding information relating to respective model image patches that have overlapping indexes; and producing respective indexes corresponding to respective encodings of current image patches;

wherein said step of comparing involves comparisons of respective model image indexes and respective current image patches;

wherein said step of identifying involves identifying matches between respective model image indexes and respective current image indexes;

wherein said step of computing involves determining a respective current image pose estimate for each respective model image patch encoding associated in the electronic memory with respective indexes identified in said step of identifying respective matches; and wherein said step of identifying a respective object pose estimate involves identifying a respective object pose estimate that corresponds to the largest number of matches of model image and current image indices.

16. The method of claim 1, wherein said step of encoding respective model image patches results in respective sets of inner products in which the information useful in computing pose estimates includes respective model image patch gradient information;

wherein said step of encoding respective current image patches results in respective sets of inner products in which the information useful in computing pose estimates includes respective current image patch gradient information; and wherein said step of computing involves determining gradient orientations associated with respective matching model image patch encodings and respective current image patch encodings identified in said step of identifying.

17. The method of claim 1 including the further step of:

determining whether the object has been identified based upon the number of patch matches that correspond to the respective identified pose estimate.

18. The method of claim 1 wherein said step of identifying a respective pose estimate that corresponds to the largest number of patch matches includes the further steps of:

providing an array of cells in the electronic memory such that there is a dimension in the array for each parameter in a given collection of parameters that represents a given computed pose estimate such that a given collection of parameters representing a given pose estimate identifies to a given array cell;

for each respective match identified in said step of identifying matches, identifying a respective cell in the array that corresponds to a respective collection of parameters representing a respective corresponding computed pose estimate and incrementing a respective count stored in the respective identified cell; and scanning the array for a memory location with the largest number.

19. A method for recognition of an object in an image comprising the steps of:

capturing in electronic memory multiple model images of the object;

capturing in electronic memory respective model image pose information for each respective model image captured in electronic memory;

selecting from each captured model image multiple collections of model image patch data;

encoding respective selected collections of model image patch data as respective collections of derivatives of such respective model image patch data;

relating in electronic memory respective pose estimate information captured for a respective model image to respective collections of derivatives produced for respective model image patch data within such respective captured model image;

capturing in electronic memory a current image of an object;

selecting from each captured current image multiple collections of current image patch data;

encoding respective selected collections of current image patch data as respective collections of derivatives of such respective current image patch data;

comparing respective collections of derivatives of current image patch data and respective collections of derivatives of model image patch data;

identifying respective matches between respective collections of derivatives of current image patch data and respective collections of derivatives of model image patch data based upon said comparisons;

producing respective object pose estimates that correspond to respective matches of respective collections of derivatives of current image patch data and respective derivatives of model image patch data based upon respective derivatives from respective matching derivative collections and respective related captured model image pose information; and identifying a respective object pose estimate that corresponds to the largest number of patch matches.

20. The method of claim 19, wherein respective collections of derivatives of model image patch data include respective sets of different order 2D Gaussian derivatives; and wherein respective collections of derivatives of current image patch data include respective sets of different order 2D Gaussian derivatives.

21. The method of claim 19, wherein said step of capturing in electronic memory respective model image pose information includes capturing respective (x,y) position parameters for each respective model image captured in electronic memory; and wherein said step of relating involves relating respective (x,y) position parameters to respective collections of derivatives produced for respective model image patch data;

wherein said step of producing respective pose estimates includes producing respective object pose estimates that correspond to respective matches of respective collections of derivatives of current image patch data and respective derivatives of model image patch data based upon current image roll computed from respective derivatives from respective matching collections of current and model image derivatives and based upon respective related captured model image (x,y) parameter information.

22. The method of claim 19 including the further step of:

determining whether the object has been identified based upon the number of patch matches that correspond to the respective identified pose estimate.

23. A method for recognition of an object in an image comprising the steps of:

capturing in electronic memory multiple model images of the object;

capturing in electronic memory respective model image pose information for each respective model image captured in electronic memory;

selecting from each captured model image multiple model image patches;

producing respective encodings of the selected model image patches which respectively represent model image patch image features and dimensional information related to model image object pose;

relating in electronic memory the respective captured pose estimate information for respective captured model images to respective model image patch encodings produced for respective model image patches that correspond to such respective captured model images;

capturing in electronic memory a current image;

selecting from the captured current image multiple current image patches;

producing respective encodings of the selected current image patches which respectively represent current image patch image features and dimensional information related to current image object pose;

comparing respective current image patch encodings representing respective current image patch features and respective model image patch encodings representing respective model image patch features;

identifying respective matches between respective current image patch features and respective model image patch features based upon said comparisons;

producing respective current object image pose estimates by computing respective first pose estimate parameters for a corresponding respective given current image based both upon dimensional information represented by a respective given current image patch encoding and upon dimensional information represented by a respective given matching model image patch encoding and computing respective second respective pose estimate parameters for the given current image based upon the respective first computed pose estimate parameter and respective captured model image pose information corresponding to the respective given matching model image patch encoding; and identifying a respective object pose estimate that corresponds to the largest number of patch matches.

24. The method of claim 23, wherein the respective first pose estimate parameter includes a current image roll parameter;

wherein the respective second pose estimate parameter includes a current image (x,y) position parameter; and wherein the respective captured model image pose information includes a model image (x,y) position parameter.

* * * * *